United States Patent [19]
Bureau et al.

[11] Patent Number: 6,010,180
[45] Date of Patent: *Jan. 4, 2000

[54] CLIP-IN WINDOW GLAZING AND MOUNTING OF THE WINDOW GLAZING IN THE FRAME OF AN OPENING

[75] Inventors: Bernard Bureau, Marqueglise; Gerard Huchet, Retheuil; Patrick Procureur, Montmartin, all of France

[73] Assignee: Saint-Gobain Vitrage, Courbevoie, France

[*] Notice: This patent issued on a continued prosecution application filed under 37 CFR 1.53(d), and is subject to the twenty year patent term provisions of 35 U.S.C. 154(a)(2).

[21] Appl. No.: 08/809,146

[22] PCT Filed: Jul. 19, 1996

[86] PCT No.: PCT/FR96/01134

§ 371 Date: May 14, 1997

§ 102(e) Date: May 14, 1997

[87] PCT Pub. No.: WO97/05355

PCT Pub. Date: Feb. 13, 1997

[30] Foreign Application Priority Data

Jul. 27, 1995 [FR] France .................. 95 09171

[51] Int. Cl.[7] ........................................ B60J 1/14
[52] U.S. Cl. .................. 296/146.16; 49/397; 49/398
[58] Field of Search .................. 296/146.1, 146.16, 296/216.02; 49/324, 501, 339, 381, 398, 397, 402

[56] References Cited

U.S. PATENT DOCUMENTS

| | | | |
|---|---|---|---|
| 4,396,221 | 8/1983 | Morgan et al. | 296/146.16 X |
| 5,457,913 | 10/1995 | Gold | 49/381 |
| 5,503,452 | 4/1996 | Moretz et al. | 296/216.02 X |
| 5,516,184 | 5/1996 | Kreye et al. | 296/146.16 |
| 5,752,342 | 5/1998 | Kreye | 49/381 X |
| 5,791,727 | 8/1998 | Doescher et al. | 296/146.16 X |

FOREIGN PATENT DOCUMENTS

| | | |
|---|---|---|
| 0 610 691 | 8/1994 | European Pat. Off. . |
| 25 44 220 | 4/1977 | Germany . |
| 58-214412 | 12/1983 | Japan . |
| 1 447 976 | 9/1976 | United Kingdom . |

OTHER PUBLICATIONS

N.T.I.S. Tech Notes, Oct. 1988, p. 879, Morrison, "Door Opens Four Ways".

Primary Examiner—Joseph D. Pape
Attorney, Agent, or Firm—Oblon, Spivak, McClelland, Maier & Neustadt, P.C.

[57] ABSTRACT

A clip-in window (100) including a panel (2) made of glass and/or of plastic and at least one hinge element (3) which has at least one rigid rod (5) which can be linked to a complementary element (6) fixed to a frame of an opening, while at the same time keeping at least a degree of freedom of rotation for opening or closing the panel when the window includes one or more hinge elements (3) positioned substantially along just one of its sides.

19 Claims, 2 Drawing Sheets

U.S. Patent    Jan. 4, 2000    Sheet 1 of 2    6,010,180
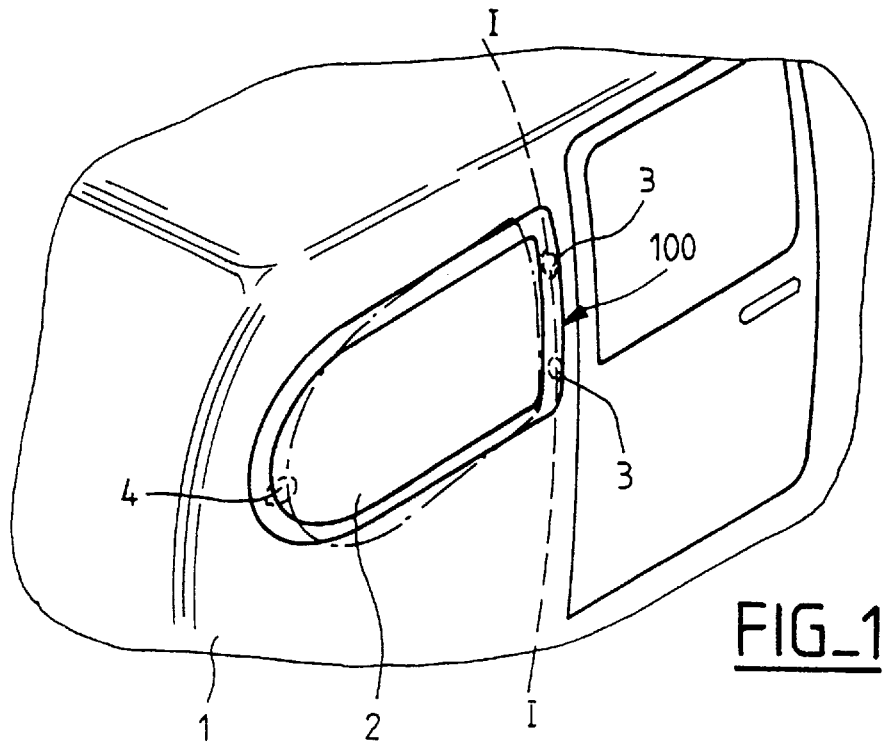
FIG_1
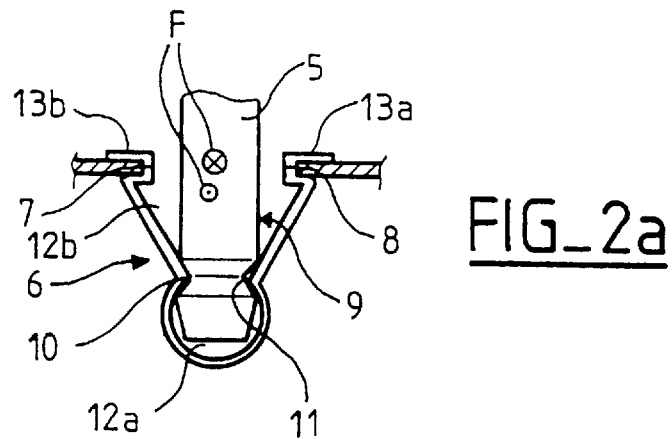
FIG_2a
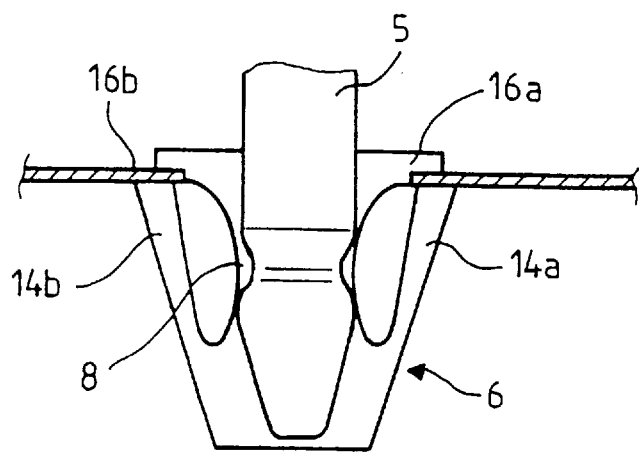
FIG_2b

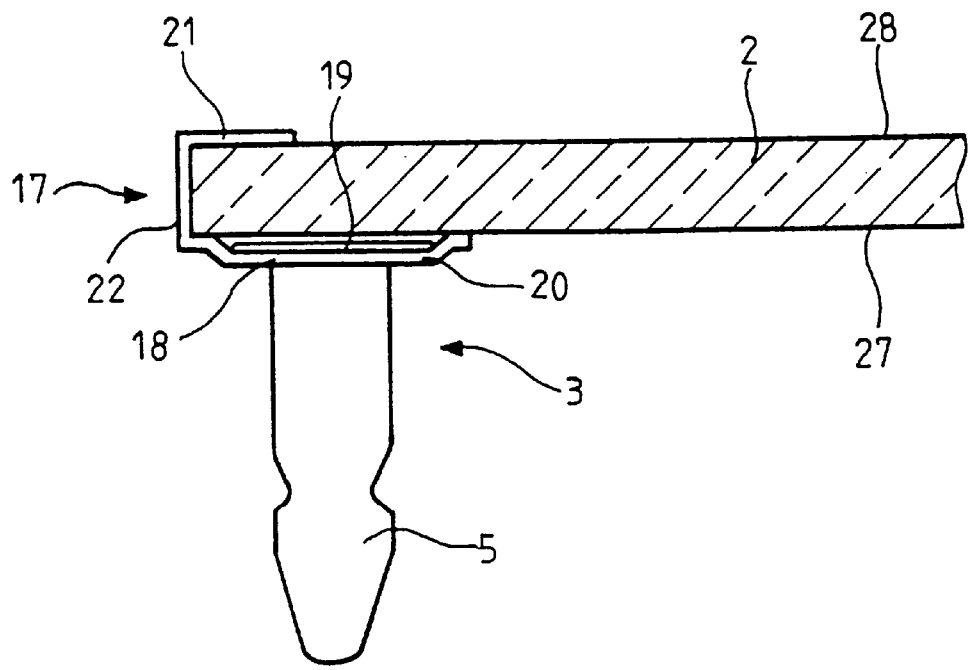
FIG_3
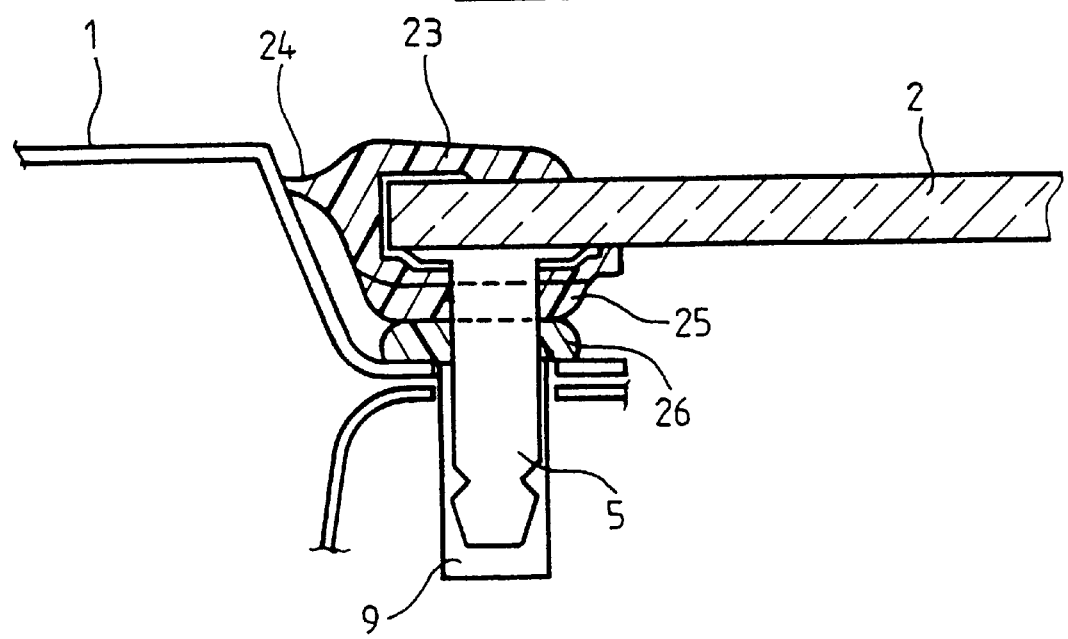
FIG_4

CLIP-IN WINDOW GLAZING AND MOUNTING OF THE WINDOW GLAZING IN THE FRAME OF AN OPENING

BACKGROUND OF THE INVENTION

1. Field of the Invention

The invention relates to clip-in window glazing which opens by rotation in appropriate configurations or, as appropriate, which does not open, comprising at least one panel made of glass and/or of plastic and at least one hinge element, particularly window glazing in which the panel is overmoulded with plastic. The invention also relates to this window glazing mounted in a frame of an opening as well as the mounting thereof.

2. Discussion of the Background

There are usually two types of opening for window glazing: opening by raising/lowering, that is to say by translation, and opening by rotation.

The invention relates to the latter type of opening, that is to say that the window glazing pivots in some way about a vertical or horizontal axis. The amplitude of opening depends on the envisaged application. For a rear window of a vehicle, the window glazing can open, for example, by 1–6°.

Panel made of glass and/or plastic is understood to mean a sheet, for example made of glass or of plastic or an assembly of sheets made of glass and/or plastic. This assembly may be symmetric (the outer sheets are of the same type, made of glass or plastic), or asymmetric (the outer sheets are of different types, one made of glass, the other made of plastic. This panel is transparent or opaque.

The frame of an opening is understood to be the support on which the window glazing is mounted. It may be the frame of a transport vehicle, for example an automobile, or a window upright or any other support.

The hinges generally used consist of a hinge in which the spindles fixed to the window glazing turn.

They are, however, unattractive because they are visible from the outside and are relatively bulky. Furthermore, the mounting of the window glazing equipped with this type of hinge involves tricky operations such as the positioning of the spindles in the hinges.

In order to overcome these drawbacks, some hinges have an element made of an elastic material, or more precisely a material acting like a spring. This may be the plastic overmoulding a transparent panel and forming a furrow defining the articulation axis as defined in the document FR 2,577,856. However, a lack of adhesion between the hinge and the panel may arise under the effect of frequent stresses on the plastic. What is more, a surface puckering thereof may also appear, and this is unattractive to look at. This type of hinge also has a problem of security because it is easily cut through by a cutting blade.

In order to overcome these drawbacks, the document EP 0,646,483 describes a hinge formed as a single element made of an elastic material fixed both to the panel and to the frame of the opening by at least one adhesive layer. This hinge element is fixed to the frame by screwing or bolting from the inside, for example of a vehicle, which is particularly tricky and wastes a lot of time.

Document EP 0,096,129 describes a hinge made as a single element, of an elastic metal which can be fixed to the frame of the opening by clamping. The means by which the hinge is fixed to the opening is, according to this document, a component in the shape of a U having a stud, the component straddling the periphery of the frame of the opening while the stud is inserted in a hole pierced beforehand in this frame. This type of fixing does, however, require the frame of the opening to have a special shape to allow this straddling. Furthermore, when fixing the hinge to the frame there is a risk that the stud will scratch the paintwork of the frame of the opening and therefore cause corrosion.

SUMMARY OF THE INVENTION

The object of the invention is, especially, to procure window glazing which opens by rotation, in which the hinge is invisible from the outside while at same time having guarantees of security and which can be fixed satisfactorily to the panel made of glass and/or of plastic and to the frame of the opening.

Another object of the invention is to propose window glazing which is mounted essentially from outside and in a particularly simple manner.

Another object of the invention is to propose window glazing which opens by rotation, equipped with at least one hinge element and with sealing and/or holding means, ready for mounting.

The invention relates to window glazing ready to be mounted in a frame of an opening essentially from the outside and comprising a transparent panel and at least one hinge element.

According to the invention, the window glazing is mounted in the frame of an opening in the normal way relative to the surface delimited by the said frame, then by clipping in, and the hinge element comprises at least one rigid rod which can be linked to a complementary element fixed to the frame of the opening, while keeping at least a degree of freedom of rotation for opening or closing the panel made of glass and/or of plastic which is of course possible, because of the clipping in, only when the window glazing has one or more hinge elements positioned on just one of its sides.

Thus, according to the invention, the opening or closing of the panel is brought about by a mechanical and non-elastic movement, which gives the opening window particularly satisfactory durability.

A rigid rod is understood to be a rod made of a non-deformable material. Its rigidity is, for example, that of a medium-carbon steel. The material is of the steel or any metal, alloy or non-deformable plastic type.

The rigid rod is linked to the frame of the opening by a complementary element. The latter comprises a cavity intended to take one end of the rigid rod and to hold it within it. It is preferably itself fixed to the opening by clamping, an elastic part pressing against the walls of an orifice pierced beforehand in the frame of the opening. Its fixing to the opening is thus ensured by the elastic part. The rod is held in the cavity of the complementary element preferably by clamping. That might be bringing part of the rod into contact against part of at least one wall of the orifice pierced in the frame of the opening, while leaving a gap to allow the rotational movement of the rod. The clamping may also be ensured by the presence of at least one groove on the rod and of at least one restriction on the wall of the cavity or vice versa. The rod may also be held within the cavity by a combination of these means or any other means in so far as the rotational movement of the rod within the cavity is possible. The rod may, as appropriate, have other degrees of freedom and especially another degree of rotation.

The material of which the complementary element is constructed has to be elastic enough to allow the passage of the element when it is placed in the hole. This material may be of the spring steel type.

The dimensions of the complementary element depend on the dimensions of the rod and of the orifice pierced in the frame of the opening. Its height is slightly greater than the height of the rod in order to allow the tilting movement while ensuring reduced bulk. It is, for example, 1 to 3 mm greater than the height of the rod. The width of the part situated through the orifice, is, for its part, slightly smaller than the diameter of the said orifice, by an amount less than or equal to 0.2 mm.

The opposite end of the rod from the one linked to the frame of the opening is preferably embedded, at least in part, in a plastic which, at least in part, provides a seal between the window glazing and the opening and/or provides the positioning and holding of the window glazing in the opening.

According to an advantageous alternative form, this plastic overmoulds the periphery of the panel made of glass and/or plastic. It preferably comprises a lip allowing the window glazing to be positioned and held in the frame of the opening. An additional means for improving the seal between the window glazing and the frame of the opening at the orifice pierced in this frame may also be provided. This may be plastic washers, the application of a spot of glue or any other sealing means. This means is, for example, situated between the plastic which, at least in part, overmoulds the panel made of glass and/or plastic and the frame of the opening. The material of which it is constructed is, for example, plastic or elastoplastic so that it accompanies the movement of the rod when the panel is opened or closed. Furthermore, it preferably also has adhesive properties with regard to the material of which the opening is constructed so as to avoid any additional use of an adhesive material. It is advantageously a plastic which is adhesive when hot without, however, running, for example a foam preimpregnated with a material giving sealing properties, of the preimpregnated poly(vinyl chloride) foam type or a material of the butyl rubber type or alternatively a material including a desiccant, for example a mixture of polyisobutylene and of butyl rubber containing a desiccant, for example a molecular sieve. A primer may optionally be applied to improve the adhesion with respect to the frame of the opening.

The dimensions of the rod are chosen, for preference, so that the opposite end of the rod to the one linked to the frame of the opening is embedded in the plastic overmoulding the panel. Its total height is, for example, between 1.5 and 3 cm.

According to a preferred alternative form of the invention, the hinge element comprises, in addition to the rod for allowing the panel to be closed or opened, a means for fixing the panel to the said element. This fixing means is advantageously a means using clamping, which avoids the creation of holes in the transparent panel, especially when the latter is made of a fragile material, especially glass. It is, for example, an element in the shape of a U, the transparent panel being clamped in the cavity of the U. The rod is, for example, secured to this fixing means.

At least one hinge element may be at least partially embedded in the plastic overmoulding the panel.

The hinge elements are distributed around the periphery of the window glazing in two different ways, both in accordance with the invention.

According to a first method, the window glazing comprises one or more hinge elements positioned substantially against one of its sides. It is therefore possible to open it or close it by rotation about the fixed point or points consisting of the hinge element or elements employed. A locking means may equip the window glazing, at the part of its periphery opposite the hinge element or elements. This alternative form is especially appropriate for motor vehicles side windows, such as a vent window or a quarter light which opens, for example, by rotation about a substantially vertical axis and also for motor vehicle sunshine roofs.

In accordance with a second embodiment of the invention, at least two hinge elements are positioned on different sides of the window glazing. The latter therefore becomes non-opening. It goes without saying that the installation of fixed window glazing of this type is particularly easy, simple and quick. Such window glazing preferably constitutes a motor vehicle window glazing, such as side glazing, especially of small dimensions, a sunshine roof or a headlamp protector.

The invention also relates to the mounting of the window glazing in a frame of an opening. According to the invention, this mounting is particularly simple because it takes place from the outside of the vehicle by pushing each end of a rigid rod into the corresponding cavity of a complementary element. When, according to a preferred alternative form of the invention, the transparent panel is overmoulded with a plastic providing the sealing, the positioning and the holding of the window glazing in the frame of the opening, the mounting consists in pushing each rod constituting a hinge element into the cavity of a complementary element. As an option, the mounting may also include the application of a sealing means between the orifice pierced in the frame of the opening and the window glazing. Whatever the case may be it is not necessary to apply an adhesive layer, to screw or to bolt a fixing means in order to obtain durable fixing of the window glazing to the opening.

BRIEF DESCRIPTION OF THE DRAWINGS

A more complete appreciation of the invention and many of the attendant advantages thereof will be readily obtained as the same becomes between understood by reference to the following detailed descriptions when considered in connection with the accompanying drawings, wherein:

FIG. 1 represents a front-on view of window glazing opened by rotation mounted in an opening according to the invention;

FIG. 2 represents two sectioned diagrams of two alternative forms of hinges according to the invention, on the axis I of FIG. 1;

FIG. 3 represents a section of window glazing fitted with a hinge according to the invention, and FIG. 4 represents a section through window glazing opening by rotation overmoulded with plastic.

DESCRIPTION OF THE PREFERRED EMBODIMENTS

Referring now to the drawings, wherein like reference numerals designate identical or corresponding parts throughout the several views, and more particularly to FIG. 1 thereof, there is illustrated a front-on view of the window glazing of the invention mounted in a frame of an opening 1. The window glazing 100 can be opened or pivoted about an axis of articulation I, here vertical, as represented by the dashed lines. The window glazing comprises a panel 2 made of glass and/or of plastic and two hinges 3 for opening and closing the panel. The number of hinges 3 depends on the dimensions of the window glazing. There are preferably two of them. These hinges are represented at the periphery of the window glazing. The latter may also include a locking means 4 making it possible either to keep the window glazing open or to lock it in the closed position.

FIG. 1 also discloses hinges 3' which when used in conjunction with hinges 3 comprise a separate embodiment of the invention wherein at least two hinge elements are positioned on different sides of the window glazing. The latter therefore becomes non-opening. It goes without saying that the illustration of fixed window glazing of this type is particularly easy, simple and quick. Such window glazing preferably constitutes a motor vehicle window glazing, such as side glazing, especially of small dimensions, a sunshine roof or a head lamp protector.

FIG. 2 is a section on the axis I of FIG. 1. Each hinge 3 comprises a rod 5, of which the rotational movement, represented diagrammatically by the double-headed arrow F, causes the opening or closing of the panel 2. This rod is held at the frame of the opening 1 by a complementary element 6. This element in this figure lies on each side of an orifice 7 pierced beforehand in the frame of the opening. It comprises an elastic part 8 which is pressed by clamping against the walls of the orifice 7, thus fixing it to the frame of the opening. It also comprises a cavity 9 in order to hold the rod 5 within it. This figure includes two diagrams representing two means of holding the rod in the cavity 9 of the complementary element and two means of fixing the complementary element to the opening. Other combinations of these various means can be envisaged without departing from the spirit of the invention.

According to diagram 2a, the rod 5 is held by a restriction 10 interacting with a groove 11, these being situated, respectively, in the wall of the orifice 7 and on the rod 11. A gap 12a and 12b allows the rod to move in the cavity 9. The complementary element is fixed to the frame of the opening by the elastic part 8 pressing against the walls of the orifice 7 as well as by the presence of flanges 13a, 13b resting on the surface of the frame 1 adjacent to the orifice 7 and thus holding the complementary element 6 through the orifice 7. In diagram 2b, the complementary element is a ball joint fixed to the frame by clamping. The rod is held in the orifice by the elastic part 8. The complementary element is fixed to the frame of the opening, according to this diagram, by the part 8 pressing against the walls of the orifice 7, by the arms 14a and 14b in contact with the opening at 15a and 15b respectively, and by the flanges 16a and 16b, all at the same time.

FIG. 3 represents a panel 2 according to the invention equipped with a hinge element 3, it being possible for this element to be mounted according to diagram 2a or 2b. It comprises a means 17 for fixing to the panel 2. This fixing means is a component in the shape of a capital U within which the panel 2 is inserted, the flanges 20 and 21 of the fixing means straddling the faces 27 and 28 respectively of the panel 2. According to an advantageous alternative form, the panel 2 is fixed to the fixing means 17 by clamping only. In this figure, the opposite end 18 of the rod 5 to the one linked to the frame of the opening is secured to the fixing means 17. An increased thickness 19 roughly corresponding to the head of the rod may be present. The two flanges 20 and 21 of the fixing means 17 may be of the same or different lengths, the interior dimension of the base 22 of this means 17 being substantially equal to the thickness of the panel 2.

FIG. 4 represents an alternative form of the invention, according to which part of the hinge is embedded in a plastic 23 molding the periphery of the panel 2. This plastic comprises a lip 24 allowing the window glazing to be positioned and/or held in the frame of the opening 1. An increased thickness part 25 of this plastic may advantageously be provided in order to cover part of the rod 5. Moreover, it makes it possible to adjust the compression of an additional sealing means 26 at the time of its application, particularly if the substance of which the sealing means 26 is composed has a tendency to run. A perfect seal between the frame of the opening and the window glazing may thus be obtained.

The invention also relates to a method for manufacturing window glazing according to the invention. This method comprises the following steps:

fixing the hinge element 3 to the panel 2 made of glass and/or plastic by clamping, the said element 3 including a means 17 for fixing to the panel and a rigid rod 5, the rotational movement of which causes the opening or the closing of the panel 2 when the window glazing comprises one or more hinge elements 3 positioned substantially along just one of its sides, placing the panel equipped with the hinge element 3 in a mould, closing the mould, injecting a plastic such that it overmoulds the transparent panel, at the same time at least partially coating the hinge element 3.

The hinge is invisible from the outside of the vehicle. Furthermore, it is particularly simple to fix into the opening. Other alternative forms of hinges may be envisaged without departing from the spirit of the invention.

What is claimed as new and desired to be secured by Letters Patent of the United States:

1. A hinged window for mounting in an opening of a frame from an outside surface of said frame, said window comprising:

a panel made of at a least one of glass and plastic and including at least one hinge element attached to said panel so as to provide at least one degree of freedom of rotation for opening or closing said panel;

said at least one hinge element, including, at least one non-threaded rigid rod extending away from said panel and having a grooved portion at an end thereof and adapted to be coupled to a cavity portion of a complementary element fixed to said frame; and wherein said panel is adapted to be mounted in said opening of said frame in a direction normal to said outside surface of said frame by forcible engagement of said grooved portion with said cavity portion.

2. The window of claim 1, wherein said panel is molded with a plastic at a location of said at least one hinged element on said panel.

3. The window of claim 2, wherein an end opposite to said groove portion of said rod is embedded at least in part in said over-molded plastic.

4. The window of claim 1, further comprising a sealing means provided on said rod between said frame and said panel.

5. The window of claim 2, wherein said molded plastic at least partially covers said at least one hinge element.

6. The window of claim 1, wherein said at least one hinge element is positioned substantially along one side of said panel so as to provide said at least one degree of freedom of rotation for opening or closing said panel.

7. The window of claim 1, wherein said at least one hinge element comprises at least two hinge elements positioned along different sides of said panel.

8. The window of claim 1, wherein said frame is provided in a vehicle and includes at least one orifice in which said complementary element is provided, and said panel is mounted from an outside of said vehicle by pushing said groove of said rigid rod into said cavity provided in said complementary element.

9. The window of claim 1, wherein said panel is provided with said at least one hinge element and said frame is respectively provided with at least one of said complementary element.

10. The window of claim 2, further comprising a sealing means provided on said rod between said frame and said panel.

11. The window of claim 4, wherein said panel is overmolded with a plastic at a location of said at least one hinged element on said panel.

12. The window of claim 6, further comprising a sealing means provided on said rod between said frame and said panel.

13. The window of claim 6, wherein said panel is molded with a plastic at a location of said at least one hinged element on said panel.

14. The window of claim 7, further comprising a sealing means provided on said rod between said frame and said panel.

15. The window of claim 7, wherein said panel is molded with a plastic at a location of said at least one hinged element on said panel.

16. The window of claim 8, further comprising a sealing means provided on said rod between said frame and said panel.

17. The window of claim 8, wherein said panel is molded with a plastic at a location of said at least one hinged element on said panel.

18. The window of claim 9, further comprising a sealing means provided on said rod between said frame and said panel.

19. The window of claim 9, wherein said panel is molded with a plastic at a location of said at least one hinged element on said panel.

* * * * *